US011286827B2

United States Patent
Sundar et al.

(10) Patent No.: US 11,286,827 B2
(45) Date of Patent: *Mar. 29, 2022

(54) SYSTEM AND METHOD FOR DETERMINING REDUCTANT DELIVERY PERFORMANCE

(71) Applicant: Cummins Inc., Columbus, IN (US)

(72) Inventors: Bharath Sundar, Darlington (GB); Apurva Arvind Chunodkar, Greenwood, IN (US); Michael Haas, Columbus, IN (US); Astha Kukreja, Boston, MA (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,727

(22) Filed: Jul. 13, 2020

(65) Prior Publication Data

US 2020/0340381 A1 Oct. 29, 2020

Related U.S. Application Data

(63) Continuation of application No. 16/069,106, filed as application No. PCT/US2017/013167 on Jan. 12, 2017, now Pat. No. 10,711,676.

(Continued)

(51) Int. Cl.
*F01N 3/00* (2006.01)
*F01N 3/20* (2006.01)
(Continued)

(52) U.S. Cl.
CPC ............. *F01N 3/208* (2013.01); *F01N 3/106* (2013.01); *F01N 11/00* (2013.01); *F01N 13/009* (2014.06);
(Continued)

(58) Field of Classification Search
CPC ........ F01N 3/208; F01N 11/00; F01N 13/009; F01N 2900/1822; F01N 2550/05;
(Continued)

(56) References Cited

U.S. PATENT DOCUMENTS 6,557,530 B1   5/2003  Benson et al.
8,027,751 B2   9/2011  Dingle
(Continued)

FOREIGN PATENT DOCUMENTS

DE    10 2012 206 430    10/2013
EP    2 585 695          5/2013
(Continued)

OTHER PUBLICATIONS

International Search Report and Written Opinion for International Application No. PCT/US2017/013167, dated Apr. 3, 2017, 8 pages.

*Primary Examiner* — Jason D Shanske

(74) *Attorney, Agent, or Firm* — Foley & Lardner LLP

(57) ABSTRACT

A system has a pump and an injector coupled to the pump. The system further comprises a controller coupled to the pump and the injector. The controller is structured to: determine a change of reductant flow relative to a change of pump rate of the pump; and generate a status command indicative of at least one of an under-restricted injector or an over-restricted injector in response to the determination of the change of reductant flow relative to the change of pump rate of the pump.

20 Claims, 6 Drawing Sheets

Related U.S. Application Data

(60) Provisional application No. 62/281,977, filed on Jan. 22, 2016.

(51) Int. Cl.
 *F01N 11/00* (2006.01)
 *F01N 3/10* (2006.01)
 *F01N 13/00* (2010.01)

(52) U.S. Cl.
 CPC ......... *F01N 11/002* (2013.01); *F01N 2550/05* (2013.01); *F01N 2550/14* (2013.01); *F01N 2610/02* (2013.01); *F01N 2610/144* (2013.01); *F01N 2610/146* (2013.01); *F01N 2900/1812* (2013.01); *F01N 2900/1821* (2013.01); *F01N 2900/1822* (2013.01); *Y02T 10/12* (2013.01); *Y02T 10/40* (2013.01)

(58) Field of Classification Search
 CPC ....... F01N 2610/146; F01N 2900/1821; F01N 2900/1812; Y02T 10/12; Y02T 10/40
 USPC .......................................................... 60/287
 See application file for complete search history.

(56) References Cited

U.S. PATENT DOCUMENTS

| | | |
|---|---|---|
| 8,155,858 B2 | 4/2012 | Lin et al. |
| 8,155,860 B2 | 4/2012 | Franco et al. |
| 8,161,808 B2 | 4/2012 | Crawford et al. |
| 8,266,892 B2 | 9/2012 | Zapf et al. |
| 8,434,431 B2 | 5/2013 | Fried et al. |
| 8,820,053 B2 | 9/2014 | Hodgson et al. |
| 9,546,585 B2 | 1/2017 | Wang et al. |
| 10,711,676 B2 * | 7/2020 | Sundar ................. F01N 13/009 |
| 2011/0083424 A1 | 4/2011 | Wang et al. |
| 2013/0055701 A1 | 3/2013 | Yan et al. |
| 2014/0309854 A1 | 10/2014 | Skelton et al. |
| 2015/0159536 A1 | 6/2015 | Hodgson et al. |

FOREIGN PATENT DOCUMENTS

| | | |
|---|---|---|
| EP | 2 660 437 A1 | 11/2013 |
| WO | WO-2014/134273 | 9/2014 |

\* cited by examiner

SYSTEM AND METHOD FOR DETERMINING REDUCTANT DELIVERY PERFORMANCE

CROSS-REFERENCE TO RELATED APPLICATIONS

This application is a continuation of U.S. patent application Ser. No. 16/069,106, filed Jul. 10, 2018, titled "SYSTEM AND METHOD FOR DETERMINING REDUCTANT DELIVERY PERFORMANCE," which is a national stage of PCT No. PCT/US2017/013167, filed Jan. 12, 2017, which the claims the benefit of and priority to U.S. Provisional Patent Application No. 62/281,977, titled "SYSTEM AND METHOD FOR DETERMINING REDUCTANT DELIVERY PERFORMANCE," filed on Jan. 22, 2016, all of which are herein incorporated by reference in their entireties and for all purposes.

TECHNICAL FIELD

The present disclosure relates to systems and methods for determining reductant delivery performance.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

Exhaust aftertreatment systems are generally designed to reduce emission of particulate matter, nitrogen oxides (NOx), hydrocarbons, and other environmentally harmful pollutants. However, the components that make up the exhaust aftertreatment system can be susceptible to failure and degradation. Because the failure or degradation of components may have adverse consequences on performance and the emission-reduction capability of the exhaust aftertreatment system, the detection and, if possible, correction of failed or degraded components is desirable.

SUMMARY

One embodiment relates to an apparatus. The apparatus includes a pump, a delivery mechanism in fluid communication with the pump, and a controller communicatively coupled to the pump and the delivery mechanism. The controller is structured to interpret, via a pump diagnostic circuit, first and second pump parameters indicative of first and second pump rates, interpret, via a dosing diagnostic circuit, first and second dosing parameters indicative of at least one of (i) first and second reductant flows or (ii) first and second injector characteristics, determine, via a delivery diagnostic circuit, a delivery status based, at least in part, on the interpretation of the first and second pump parameters and the first and second dosing parameters, and generate, via the delivery diagnostic circuit, a status command indicative at least one of an under-restricted delivery mechanism or an over-restricted delivery mechanism in response to the determination of the delivery status.

These and other features, together with the organization and manner of operation thereof, will become apparent from the following detailed description when taken in conjunction with the accompanying drawings.

DETAILED DESCRIPTION

Figure 1:
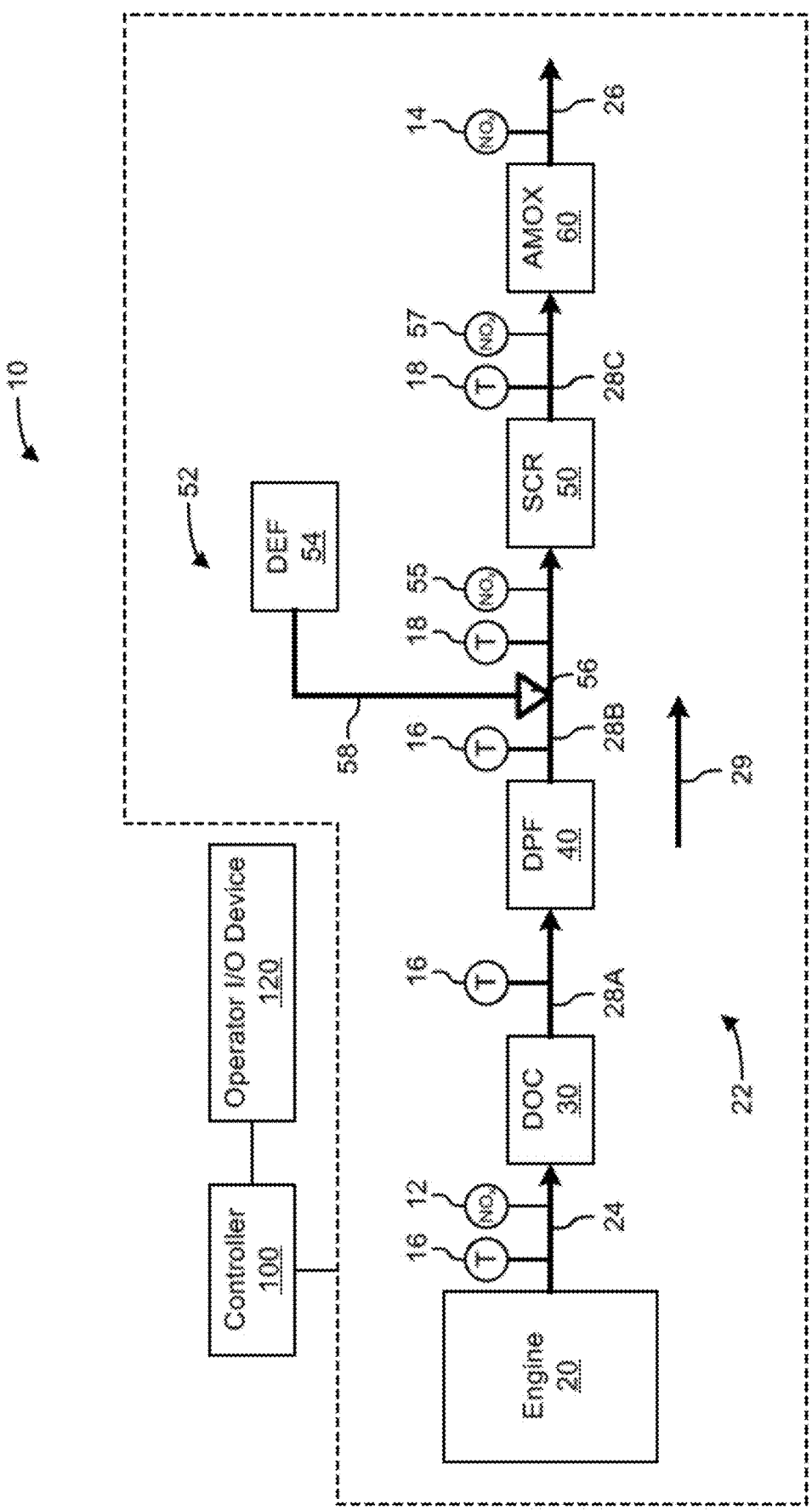
FIG. 1 is a schematic diagram of an exhaust aftertreatment system with a controller, according to an example embodiment.

Following below is a detailed description of various concepts related to, and implementations of, methods, apparatuses, and systems for determining reductant delivery performance. The various concepts introduced above and discussed in greater detail below may be implemented in any of numerous ways, as the described concepts are not limited to any particular manner of implementation. Examples of specific implementations and applications are provided primarily for illustrative purposes.

Referring to the Figures generally, the various embodiments disclosed herein relate to a system and method for determining reductant delivery performance. According to the present disclosure, a controller interprets first and second pump parameters indicative of first and second pump rates, interprets first and second dosing parameters indicative of first and second reductant flows, determines a delivery status based, at least in part, on the interpretation of the first and second pump parameters and the first and second dosing parameters, and generates a status command indicative at least one of an under-restricted delivery mechanism or an over-restricted delivery mechanism in response to the determination of the delivery status. As used herein, "pump parameters" refer to characteristics, data, or information relating to operation of the pump. Accordingly, pump parameters may include, but are not limited to, information indicative of a speed of the pump, a flow rate of DEF through the pump, an on-time of the pump (e.g., when the pump is turned on, how long the pump is turned on, etc.), and any other information that may be used to ascertain, observe, or otherwise monitor operation of the pump.

Conventional systems that estimate or determine reductant delivery performance utilize non-intrusive approaches, such as comparing an estimated system parameter to a measured system parameter. Conventional systems have also utilized intrusive approaches, such as temporarily disabling the closed-loop control and operating in open-loop mode or performing signal processing at a high dosing command. However, these approaches tend to be very sensitive to the vehicle operation cycle and do not reliably exhibit the desired diagnostic separation between healthy and failed systems.

Generally speaking, these conventional systems fail to be robust to all of the variation in vehicle operation cycle, installation, and part manufacturing tolerances. As a result, these diagnostic systems tend to be inaccurate at determining reductant delivery performance. As described more fully herein, Applicants have developed a system, method, and apparatus for determining reductant delivery performance by utilizing signal processing to interpret various pump parameters and dosing parameters (e.g., Injection On Time) at a plurality of predetermined positions. In contrast and in another embodiment, an intrusive diagnostic test may be performed. As used herein, the term "intrusive" (in regard to performing one or more diagnostic tests) is used to refer to an active diagnostic test. In other words, an intrusive method, system, and apparatus describe a diagnostic test or protocol that is forced to run on the engine and exhaust aftertreatment system (i.e., causes the engine to operate at a certain speed, etc.). An intrusive diagnostic test may manipulate or excite the NOx emissions in the exhaust gas emitted from the engine system. In this regard, an "intrusive diagnostic test" may include overriding various set engine operating points to perform the diagnostic test. For example, many engine operating points are set to be in compliance with one or more vehicular laws (e.g., emissions, etc.). In some embodiments, overriding one or more of these operating points may force the engine into non-compliance with one or more vehicular laws. In such embodiments, the active or intrusive diagnostic test is often run in a service bay, test center environment, or other controlled environment.

Through experimentation, Applicants have discovered that the use of pump parameters (e.g., pump motor speed) and dosing parameters (e.g., DEF flow, reductant flow, etc.) provides a relatively more accurate determination of reductant delivery performance over conventional systems and methods. Technically and advantageously, a result of the present disclosure is an increased level of control over one or more components in an exhaust aftertreatment system. For example, when the reductant delivery performance is inaccurately determined, a delivery mechanism (e.g., a fuel injector or doser) may under dose or overdose effectively failing to meet the requirements mandated by regulatory agencies. This incorrect injection amount may cause incorrect OBD fault triggers for other diagnostics, poor diagnostics of reductant delivery performance, potentially unnecessary service on the aftertreatment system, increased warranty costs, and increased service time. Accordingly and advantageously, the system and method of the present disclosure may reduce warranty costs and service timing, provide relatively accurate reductant delivery performance determinations in both steady state and transient engine cycles, and facilitate an increased level of control over various aftertreatment components (e.g., a DEF injector, etc.). These and other features of the present disclosure are more fully explained herein.

Referring now to FIG. 1, an engine exhaust aftertreatment system with a controller is shown, according to an example embodiment. It should be understood that the schematic depicted in FIG. 1 is but one implementation of an engine exhaust aftertreatment system. Many different configurations may be implemented that utilize the systems and methods described herein. Accordingly, while the system and method described herein are primarily directed to the diesel or compression-ignition engine exhaust aftertreatment system depicted in FIG. 1, it should be understood that the system and method of the present disclosure may be used in a various exhaust aftertreatment system configurations, such that the embodiment depicted in FIG. 1 is not meant to be limiting.

As shown in FIG. 1, the engine system 10 includes an internal combustion engine 20 and an exhaust aftertreatment system 22 in exhaust gas-receiving communication with the engine 20. Within the internal combustion engine 20, air from the atmosphere is combined with fuel, and combusted, to power the engine. Combustion of the fuel and air in the compression chambers of the engine 20 produces exhaust gas that is operatively vented to an exhaust manifold and to the exhaust aftertreatment system 22.

NOx (nitrogen oxides including NO and $NO_2$) is a byproduct of combustion. The emission of NOx from an engine may be undesirable due to NOx (along with other compounds) having the ability to form smog, acid rain, and other types of pollution. The formation of NOx may be described in regard to the Zeldovich Mechanism (equations (1)-(3)):

$$O + N_2 \rightarrow NO + N \quad (1)$$

$$N + O_2 \rightarrow O + NO \quad (2)$$

$$N + OH \rightarrow H + NO \quad (3)$$

Equations (1)-(3) are reversible and refer to the Zeldovich Mechanism that describes how NOx may be formed.

In the example depicted, the exhaust aftertreatment system 22 includes a diesel particulate filter (DPF) 40, a diesel oxidation catalyst (DOC) 30, a selective catalytic reduction (SCR) system 52 with a SCR catalyst 50, and an ammonia oxidation (AMOx) catalyst 60. The SCR system 52 further includes a reductant delivery system that has a diesel exhaust fluid (DEF) source 54 that supplies DEF to a DEF doser 56 via a DEF line 58. In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC into a first section of exhaust piping 28A. From the first section of exhaust piping 28A, the exhaust gas flows into the DPF 40 and exits the DPF into a second section of exhaust piping 28B. From the second section of exhaust piping 28B, the exhaust gas flows into the SCR catalyst 50 and exits the SCR catalyst into the third section of exhaust piping 28C. As the exhaust gas flows through the second section of exhaust piping 28B, it is periodically dosed with DEF by the DEF doser 56. Accordingly, the second section of exhaust piping 28B acts as a decomposition chamber or tube to facilitate the decomposition of the DEF to ammonia. From the third section of exhaust piping 28C, the exhaust gas flows into the AMOx catalyst 60 and exits the AMOx catalyst into outlet piping 26 before the exhaust gas is expelled from the exhaust aftertreatment system 22. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOX catalyst 60. However, in alternative embodiments, other arrangements of the components of the exhaust aftertreatment system 22 are also possible.

The DOC 30 may have any of various flow-through designs. Generally, the DOC 30 is structured to oxidize at least some particulate matter, e.g., the soluble organic fraction of soot, in the exhaust and reduce unburned hydrocarbons and CO in the exhaust to less environmentally harmful compounds. For example, the DOC 30 may be structured to reduce the hydrocarbon and CO concentrations in the exhaust to meet the requisite emissions standards for those components of the exhaust gas. An indirect consequence of the oxidation capabilities of the DOC 30 is the ability of the DOC to oxidize NO into $NO_2$. In addition to treating the hydrocarbon and CO concentrations in the exhaust gas, the DOC 30 may also be used in the controlled regeneration of the DPF 40, SCR catalyst 50, and AMOx catalyst 60. This may be accomplished through the injection, or dosing, of unburned HC into the exhaust gas upstream of the DOC 30. Upon contact with the DOC 30, the unburned HC undergoes an exothermic oxidation reaction which leads to an increase in the temperature of the exhaust gas exiting the DOC 30 and subsequently entering the DPF 40, SCR catalyst 50, and/or the AMOx catalyst 60. The amount of unburned HC added to the exhaust gas is selected to achieve the desired temperature increase or target controlled regeneration temperature.

The DPF 40 may be any of various flow-through or wall-flow designs, and is structured to reduce particulate matter concentrations, e.g., soot and ash, in the exhaust gas to meet or substantially meet requisite emission standards. The DPF 40 captures particulate matter and other constituents, and thus may need to be periodically regenerated to burn off the captured constituents. Additionally, the DPF 40 may be configured to oxidize NO to form $NO_2$ independent of the DOC 30.

As briefly described above, the SCR system 52 may include a reductant delivery system with a reductant (e.g., DEF) source 54, a pump and a delivery mechanism or doser 56. The reductant source 54 can be a container or tank capable of retaining a reductant, such as, for example, ammonia ($NH_3$), DEF (e.g., urea), or hydrocarbons. The reductant source 54 is in reductant supplying communication with the pump, which is configured to pump reductant from the reductant source to the delivery mechanism 56 via a reductant delivery line 58. The delivery mechanism 56 is positioned upstream of the SCR catalyst 50. The delivery mechanism 56 is selectively controllable to inject reductant directly into the exhaust gas stream prior to entering the SCR catalyst 50. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$. The SCR catalyst 50 may be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst.

The AMOx catalyst 60 may be any of various flow-through catalysts configured to react with ammonia to produce mainly nitrogen. As briefly described above, the AMOx catalyst 60 is structured to remove ammonia that has slipped through or exited the SCR catalyst 50 without reacting with NOx in the exhaust. In certain instances, the exhaust aftertreatment system 22 may be operable with or without an AMOx catalyst. Further, although the AMOx catalyst 60 is shown as a separate unit from the SCR catalyst 50 in FIG. 1, in some implementations, the AMOx catalyst may be integrated with the SCR catalyst, e.g., the AMOx catalyst and the SCR catalyst can be located within the same housing. According to the present disclosure, the SCR catalyst and AMOx catalyst are positioned serially, with the SCR catalyst preceding the AMOx catalyst. In various other embodiments, the AMOx catalyst is not included in the exhaust aftertreatment system 22. In these embodiments, the NOx sensor 14 may be excluded from the exhaust aftertreatment system 22 as well.

As shown, a plurality of sensors are included in the aftertreatment system 22. The number, placement, and type of sensors included in the system 22 is shown for example purposes only. In other configurations, the number, placement, and type of sensors may differ. As shown, the system 22 includes NOx sensors 12, 14, 55, 57 and temperature sensors 16, 18. The temperature sensors 16, 18 are structured to acquire data indicative of a temperature at their locations. The NOx sensors 12, 14, 55, and 57 are structured to acquire data indicative of a NOx amount at each location that the NOx sensor is located. The system 22 may include a $NH_3$ sensor and a particulate matter (PM) sensor (not shown). The $NH_3$ sensor is structured to acquire data indicative of a $NH_3$ amount in the SCR 50. The PM sensor is structured to monitor particulate matter flowing through the exhaust aftertreatment system 22. The controller 100 is communicably coupled to each of the sensors in the aftertreatment system 22. Accordingly, the controller 100 is structured to receive data from one more of the sensors. The received data may be used by the controller 100 to control one more components in the aftertreatment system and/or for monitoring and diagnostic purposes.

As mentioned above, although the exhaust aftertreatment system 22 shown includes one of a DOC 30, DPF 40, SCR catalyst 50, and AMOx catalyst 60 positioned in specific locations relative to each other along the exhaust flow path, in other embodiments, the exhaust aftertreatment system may include more than one of any of the various catalysts positioned in any of various positions relative to each other along the exhaust flow path as desired. Further, although the DOC 30 and AMOX catalyst 60 are non-selective catalysts, in some embodiments, the DOC and AMOX catalyst can be selective catalysts.

FIG. 1 is also shown to include an operator input/output (I/O) device 120. The operator I/O device 120 is communicably coupled to the controller 100, such that information may be exchanged between the controller 100 and the I/O device 120, wherein the information may relate to one or more components of FIG. 1 or determinations (described below) of the controller 100. The operator I/O device 120 enables an operator of the engine system 10 to communicate with the controller 100 and one or more components of the engine system 10 of FIG. 1. For example, the operator input/output device 120 may include, but is not limited to, an interactive display, a touchscreen device, one or more buttons and switches, voice command receivers, etc. In various alternate embodiments, the controller 100 and components described herein may be implemented with non-vehicular applications (e.g., a power generator that utilizes an exhaust aftertreatment system having a reductant delivery sub-system). Accordingly, the I/O device may be specific to those applications. For example, in those instances, the I/O device may include a laptop computer, a tablet computer, a desktop computer, a phone, a wearable (e.g., a smart watch, smart optical wear, etc.), a personal digital assistant, etc.

The controller 100 may be structured to control or at least partly control the operation of the engine system 10 and associated sub-systems, such as the internal combustion engine 20 and the exhaust gas aftertreatment system 22 (and various components of each system such as the doser 56). According to one embodiment, the components of FIG. 1 are embodied in a vehicle. In various alternate embodiments, as described above, the controller 100 may be used with any other engine-exhaust aftertreatment system (e.g., a power generator). The vehicle may include an on-road or an off-road vehicle including, but not limited to, line-haul trucks, mid-range trucks (e.g., pick-up trucks), tanks, airplanes, and any other type of vehicle that utilizes an exhaust aftertreatment system. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, Bluetooth, cellular, radio, etc. In one embodiment, a controller area network (CAN) bus provides the exchange of signals, information, and/or data. The CAN bus includes any number of wired and wireless connections. Because the controller 100 is communicably coupled to the systems and components of FIG. 1, the controller 100 is structured to receive data from one or more of the components shown in FIG. 1. The structure and function of the controller 100 is further described in regard to FIG. 3.

Figure 2:
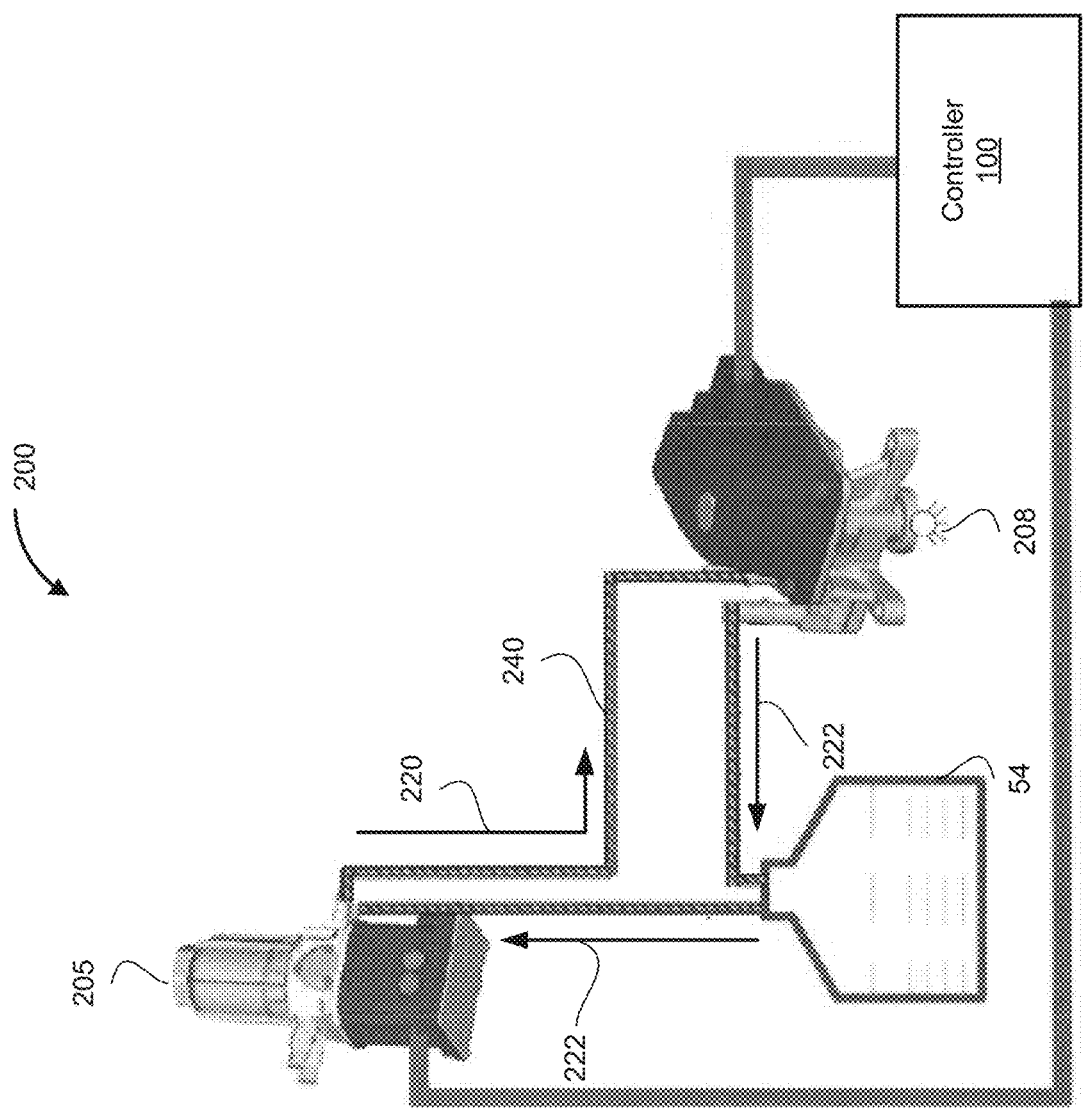
FIG. 2 is a schematic diagram of a reductant delivery system for an engine and the contents thereof, according to an example embodiment.

Referring now to FIG. 2, a schematic diagram of a reductant delivery system 200 for an engine is shown, according to an example embodiment. As shown, the reductant delivery system 200 is a part of the system 10 of FIG. 1. Accordingly, the reductant delivery system 200 may include a pump 205 and a delivery mechanism 208 (e.g., an injector or doser). As depicted, the delivery mechanism 208 is in fluid communication with the pump 205. The pump 205 is structured to pump reductant (e.g., urea) from the reductant source 54 (e.g., a tank comprising urea) to the delivery mechanism 208 (e.g., a fuel injector). In some embodiments, the pump 205 as depicted is structured to maintain a minimum pressure within the delivery mechanism 208. For example, when the delivery mechanism 208 is in a closed position (e.g., the delivery mechanism is not dosing), the pump 205 is structured to recirculate the DEF via a channel 240 (e.g., a supply line). In other embodiments, the pump 205 is further structured to maintain a predetermined pressure (e.g., 850 kPa) within the delivery mechanism 208 (e.g., within the injector nozzle). In alternative embodiments when the delivery mechanism 208 is in an open position (e.g., the delivery mechanism is dosing DEF), the pump 205 may be further structured to maintain the predetermined pressure (e.g., 850 kPa). To that end, the pump 205 may be structured to circulate the DEF as indicated by directional arrow 220, 222.

The reductant delivery system 200 also includes the controller 100 which is communicatively coupled to the pump 205 and the delivery mechanism 208. In some embodiments, the controller 100 is structured to receive data provided by each of the pump 205 and the delivery mechanism 208, wherein the received data may include, but is not limited to, pump command, pump motor speed, injector ontime, reductant flow rate, commanded reductant flow rate, exhaust gas temperature, exhaust flow rate, and reductant pressure. The received data may be used by the controller 100 to control one more components in the aftertreatment system and/or for monitoring and diagnostic purposes. To that end, the controller 100 may be structured, in some embodiments, to correlate and/or utilize the relationship between pump parameters (e.g., pump motor speed) and dosing parameters (e.g., DEF flow command or injector OnTime) as described herein with reference to FIG. 3. Accordingly, Applicants have discovered that the use of pump parameters (e.g., pump motor speed or pump motor speed command) and dosing parameters (e.g., DEF flow command or injector OnTime) facilitates a relatively more accurate determination of reductant delivery performance.

Figure 3:
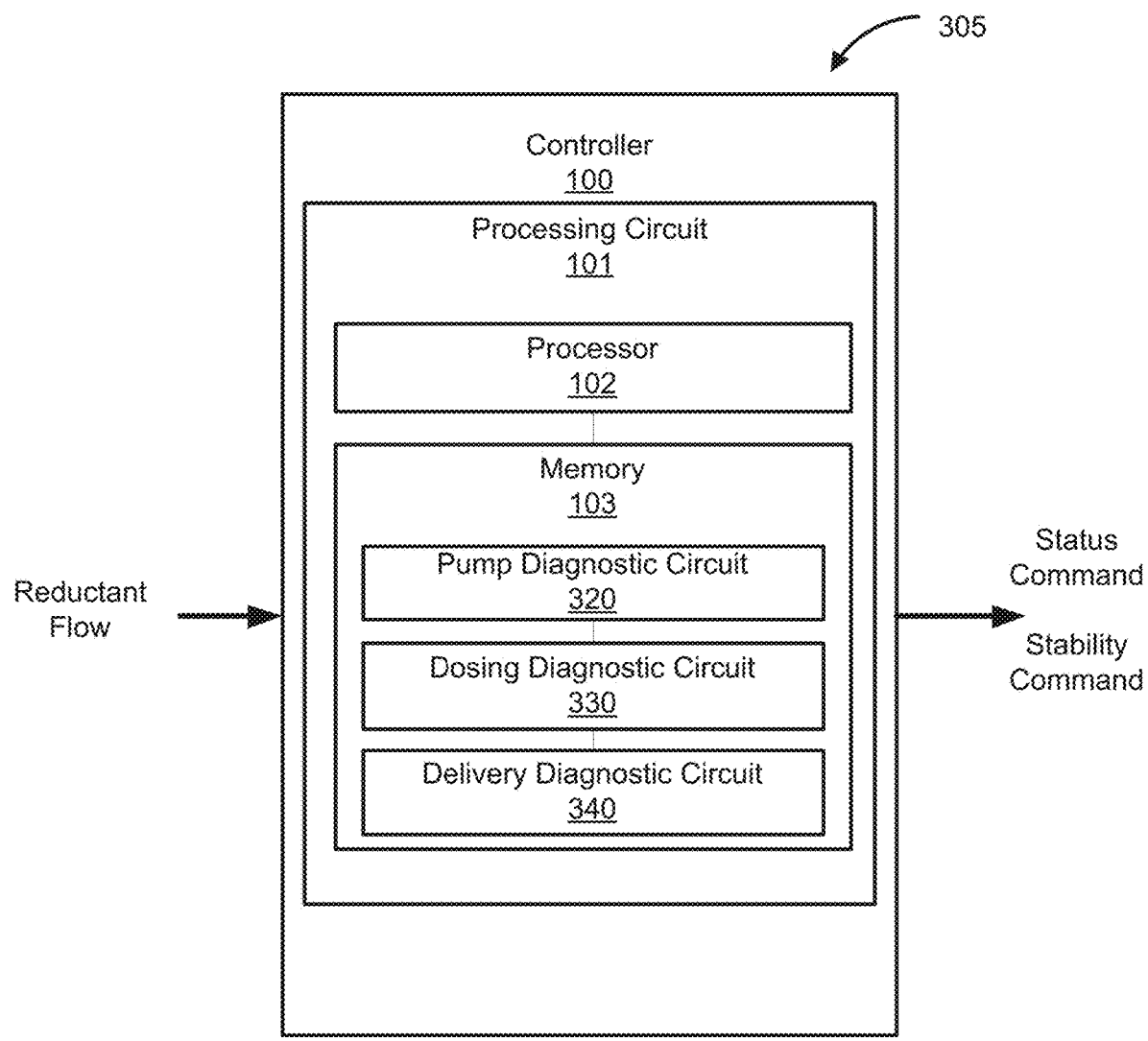
FIG. 3 is a schematic diagram of the controller used with the system of FIG. 1 and FIG. 2, according to an example embodiment.

With the above description in mind, referring now to FIG. 3, an example structure for the controller 100 is shown according to one embodiment. As shown, the controller 100 includes a processing circuit 101 including a processor 102 and a memory 103. The processor 102 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 103 (e.g., RAM, ROM, Flash Memory, hard disk storage, etc.) may store data and/or computer code for facilitating the various processes described herein. Thus, the one or more memory devices 103 may be communicably connected to the processor 102 and provide computer code or instructions to the processor 102 for executing the processes described in regard to the controller 100 herein. Moreover, the one or more memory devices 103 may be or include tangible, non-transient volatile memory or non-volatile memory. Accordingly, the one or more memory devices 103 may include database components, object code components, script components, or any other type of information structure for supporting the various activities and information structures described herein.

The memory 103 is shown to include various circuits for completing at least some of the activities described herein. More particularly, the memory 103 includes circuits structured to facilitate the determination of reductant delivery performance. While various circuits with particular functionality are shown in FIG. 3, it should be understood that the controller 100 and memory 103 may include any number of circuits for completing the functions described herein. For example, the activities of multiple circuits may be combined as a single circuit, additional circuits with additional functionality may be included, etc. Further, it should be understood that the controller 100 may control other activity beyond the scope of the present disclosure, such as the control of other vehicle systems. In this regard, the controller 100 may be embodied as an electronic control unit (ECU) included with a vehicle or included with an existing ECU, such as a transmission control unit and any other vehicle control unit (e.g., exhaust aftertreatment control unit, powertrain control circuit, engine control circuit, etc.). All such structural configurations of the controller 100 are intended to fall within the spirit and scope of the present disclosure.

Certain operations of the controller 100 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown, the controller 100 includes a pump diagnostic circuit 320, a dosing diagnostic circuit 330, and a delivery diagnostic circuit 340. The pump diagnostic circuit 320 is structured to interpret first and second pump parameters (e.g., pump speed command or duty cycle) indicative of first and second pump rates (e.g., actual pump speed). In some embodiments, the pump speed is approximately equal or proportional to the pump command at steady-state operation. Accordingly, the pump diagnostic circuit 320 is structured to correlate the first and second pump parameters to the first and second pump rates. In one embodiment, the pump diagnostic circuit 320 may include or be communicably coupled with an engine sensor such as an engine speed sensor for receiving a value indicative of the speed of the engine. In another embodiment, the pump diagnostic circuit 320 may include communication circuitry including, but not limited to, wired and wireless communication protocol to facilitate reception of a value indicative of the speed of the engine. In still another embodiment, the pump diagnostic circuit 320 may include machine-readable media stored by the memory and executable by the processor, wherein the machine-readable media facilitates performance of certain operations to receive a value of the speed of the engine. For example, the machine-readable media may provide an instruction (e.g., command, etc.) to an engine speed sensor operatively coupled to the engine to monitor and acquire data indicative of the speed of the engine. In this regard, the machine-readable media may include programmable logic that defines the frequency of acquisition of the engine speed data. In yet another embodiment, the pump diagnostic circuit 320 may include any combination of machine-readable content, communication circuitry, and the engine sensor. The first and second pump parameters may be stored in memory (e.g., the memory 103) by the pump diagnostic circuit 320. The pump diagnostic circuit 320 may utilize the processor 102 to perform the actions described herein. In some embodiments, the pump diagnostic circuit 320 is structured to provide the first and second pump parameters to the delivery diagnostic circuit 340.

In some embodiments, the dosing diagnostic circuit 330 is structured to interpret first and second dosing parameters (e.g., injector OnTime) indicative of at least one of (i) first and second reductant flows or (ii) first and second injector characteristics. In one embodiment, the dosing diagnostic circuit 330 may include or be communicably coupled with an engine sensor such as an engine speed sensor for receiving a value indicative of the speed of the engine. In another embodiment, the dosing diagnostic circuit 330 may include communication circuitry including, but not limited to, wired and wireless communication protocol to facilitate reception of a value indicative of the speed of the engine. In still another embodiment, the dosing diagnostic circuit 330 may include machine-readable media stored by the memory and executable by the processor, wherein the machine-readable media facilitates performance of certain operations to receive a value of the speed of the engine. For example, the machine-readable media may provide an instruction (e.g., command, etc.) to an engine speed sensor operatively coupled to the engine to monitor and acquire data indicative of the speed of the engine. In this regard, the machine-readable media may include programmable logic that defines the frequency of acquisition of the engine speed data. In yet another embodiment, the pump dosing diagnostic circuit 330 may include any combination of machine-readable content, communication circuitry, and the engine speed sensor. The first and second reductant flows include the DEF flow corresponding to the pump 205. In some embodiments, the DEF flow is approximately equal or proportional to the dosing parameters. Accordingly, the dosing diagnostic circuit 330 is structured to correlate the first and second reductant flows to the first and second dosing parameters. The first and second dosing parameters may be stored in memory (e.g., the memory 103) by the dosing diagnostic circuit 330. The dosing diagnostic circuit 330 may utilize the processor 102 to perform the actions described herein. As will be appreciated by one of ordinary skill in the art, the delivery mechanism 208 may demonstrate a direct relationship between the first and second reductant flows and the and first and second dosing parameters. The correlation of the reductant flow (e.g., DEF flow) to the dosing parameters (e.g., Injector OnTime) is described herein with reference to FIG. 4. In further embodiments, the dosing diagnostic circuit 330 may be structured to provide the first and second dosing parameters to the delivery diagnostic circuit 340.

In some embodiments, the delivery diagnostic circuit 340 is structured to determine a delivery status based, at least in part, on the interpretation of the first and second pump parameters and the first and second dosing parameters. In one embodiment, the delivery diagnostic circuit 340 may include communication circuitry including, but not limited to, wired and wireless communication protocols and/or machine-readable media stored by the memory and executable by the processor. In yet another embodiment, the delivery diagnostic circuit 340 may include any combination of machine-readable content, communication circuitry, etc. In some embodiments, the delivery diagnostic circuit 340 may be structured to receive, via the pump diagnostic circuit 320, the first and second pump parameters. Alternatively or additionally, the delivery diagnostic circuit 340 may be structured to obtain, via the processor 102, the first and second pump parameters from the memory 103.

In other embodiments, the delivery diagnostic circuit 340 may be structured to receive, via the dosing diagnostic circuit 330, the first and second dosing parameters. Alternatively or additionally, the delivery diagnostic circuit 340 may be structured to obtain, via the processor 102, the first and second dosing parameters from the memory 103.

As will be appreciated, the pump parameters (e.g., the Pump Command (%)) and the dosing parameters (e.g., Injector OnTime) may be averaged over a calibratable time duration at a plurality of positions (e.g., at a first level and a second level). The delivery diagnostic circuit 340 may be structured to average the pump parameters and/or the dosing parameters at a predetermined pressure (e.g., while the pressure control is stable).

In further embodiments, the delivery diagnostic circuit 340 may be structured to determine a delivery status, wherein the delivery status is indicative of a diagnostic metric corresponding to at least one of the pump 205 and delivery mechanism 208). In one embodiment, the delivery status may be based on a difference of the first and second pump parameters and a difference of the first and second dosing parameters.

An example process that may be utilized by the delivery diagnostic circuit 340 to determine the delivery status is as follows:

Delivery Status = (4)

$$\text{Slope} = \frac{OnTime_{DL2} - OnTime_{DL1}}{PumpCmd_{DL2} - PumpCmd_{DL1}} = \frac{\Delta OnTime}{\Delta PmpCmd},$$

The "$OnTime_{DL1}$" and "$OnTime_{DL2}$" refers to the reductant flows at a first position (e.g., at level 1) and a second position (e.g., at level 2). The first position may be indicative of a low injection OnTime and the second position may indicate a higher injection OnTime than the first position. The further apart the first position is with respect to the second position, the larger the separation between a properly functioning system (e.g., a stable system) and an improperly functioning system (e.g., an eroded and/or clogged system) as illustrated herein with reference to FIG. 5. For a delivery mechanism (e.g., a reductant injector of the solenoid type), OnTime may be approximately proportional to the flow of reductant through the delivery mechanism. The respective positions correspond to predefined levels of reductant flow that may be commanded intrusively by the diagnostic or commanded by the controller 100. The "ΔOnTime" refers to a change of the reductant flow and "ΔPmpCmd" refers to a change of the pump rate. As will be appreciated by one of ordinary skill in the art, the delivery status may also be determined by an inverse relationship, such as ΔPmpCmd/ΔOnTime. The delivery status may be stored in memory (e.g., the memory 103) by the delivery diagnostic circuit 340. The delivery diagnostic circuit 340 may utilize the processor 102 to perform the actions described herein.

In some embodiments, the delivery diagnostic circuit 340 may utilize the delivery status to determine the status of a delivery mechanism 208. The delivery mechanism 208 may take the form of an over-restricted delivery mechanism (e.g., an at least partially blocked injector, slow-responding injector solenoid, blocked lines, defective pump, etc.) and/or an under-restricted delivery mechanism (e.g., an eroded injector, faulty injector solenoid, leaky lines, defective pump, etc.). The determination of an over-restricted delivery mechanism or an under-restricted delivery mechanism may include determining whether the delivery status exceeds a predetermined status. As will be appreciated, an over-restricted (e.g., the delivery status of the dosing parameter is above 3.2) delivery mechanism may dose less than the desired quantity, while an under-restricted (e.g., the delivery status of the dosing parameter is below 2.1) delivery mechanism may dose more than the desired quantity. For example, the delivery diagnostic circuit 340 may be structured to indicate an over-restricted delivery mechanism in response to the predetermined status exceeding the delivery status. In one example embodiment, the under-restricted delivery mechanism may result in a deviation from nominal by 40%. In another example embodiment, the over-restricted delivery mechanism may result in a deviation from nominal by 25%. In other example embodiments, the delivery diagnostic circuit 340 may be structured to indicate an under-restricted delivery mechanism in response to the delivery status exceeding the predetermined status. In further embodiments, the delivery mechanism 208 may take the form of an over-restricted delivery mechanism (e.g., an at least partially blocked injector) and an under-restricted delivery mechanism (e.g., a partially eroded injector). Further description is provided herein with reference to FIG. 5, a plot illustrating the relationship between the dosing parameters and the delivery status corresponding to a delivery mechanism which is, for example, 30% eroded (e.g., under-restricted) and 30% blocked (e.g., over-restricted).

Furthermore, the delivery diagnostic circuit 340, in some embodiments, is structured to generate a status command indicative of at least one of an under-restricted delivery mechanism or an over-restricted delivery mechanism in response to the determination of the delivery status. The status command may be generated when the delivery status indicates a value in the range of 1.5 to 4. To that end, the delivery diagnostic circuit 340 may be structured to provide the status command to the operator I/O device 120 (e.g., an interactive display, a touchscreen device, one or more buttons and switches, voice command receivers) to communicate the status of the reductant delivery performance to an operator of the engine system 10. Furthermore, the delivery diagnostic circuit 340, in some embodiments, is structured to generate a status command indicative at least one of an under-restricted delivery mechanism or an over-restricted delivery mechanism in response to the determination of the delivery status. In some embodiments, the delivery diagnostic circuit 340 may be structured to adjust the first and second pump parameters or the first and second dosing parameters in response to the determination of the delivery status to stabilize the engine system 10. The determination of an over-restricted or under-restricted condition may result in a command to change the engine operating characteristic.

Figure 4:
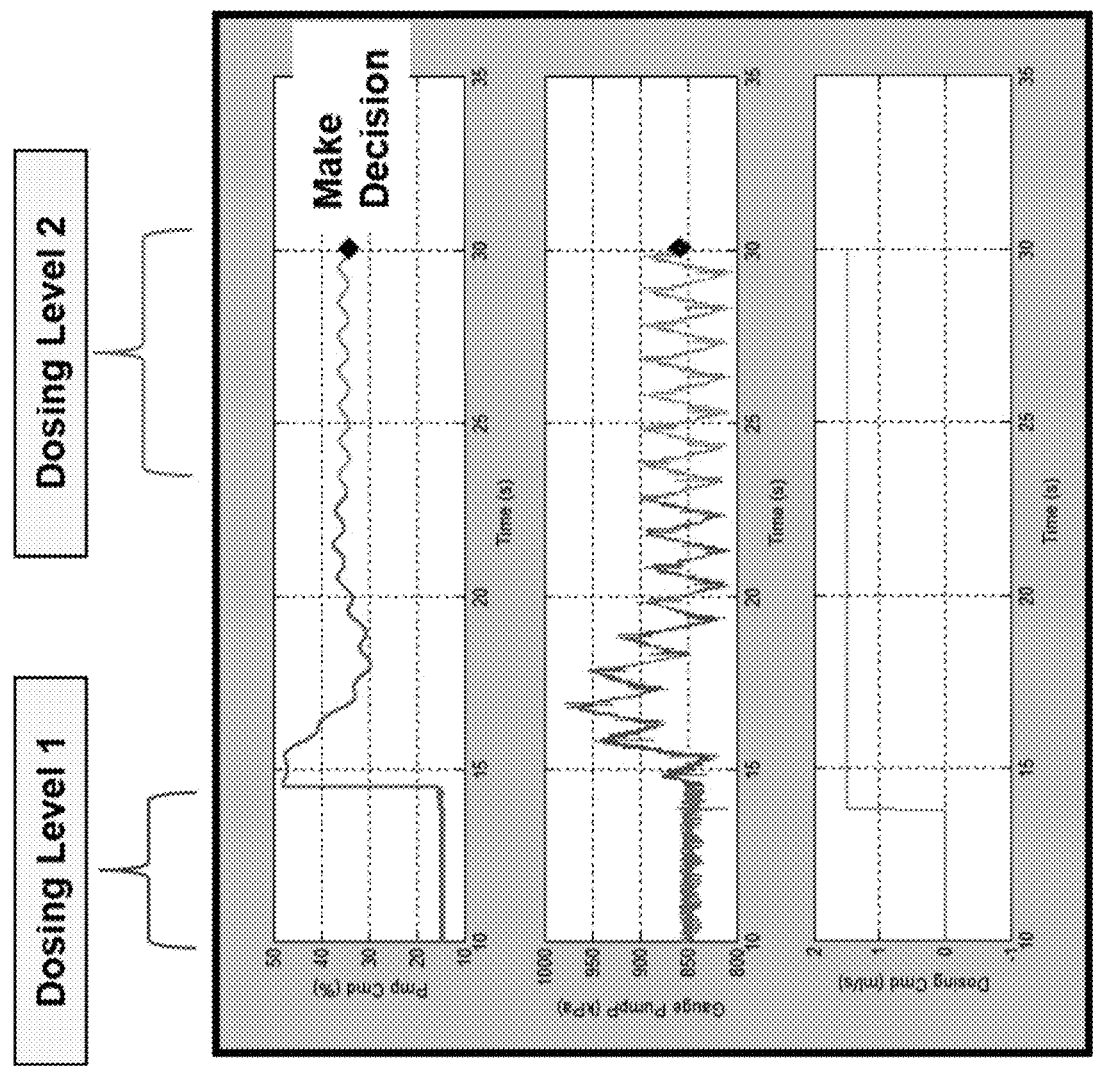
FIG. 4 is a graph illustrating reductant delivery performance according to an example embodiment.

Referring now to FIG. 4, a graph illustrating reductant delivery performance is shown according to an example embodiment. In some embodiments, the reductant delivery performance is determined based, at least in part, on a plurality of positions (e.g., calibratable dosing levels such as a first level DL1 and a second level DL2). The delivery diagnostic circuit 340 as described herein with reference to FIG. 3 may be structured to analyze the first and second pump parameters (e.g., the Pump Command (%)) corresponding to the first and second positions. In further embodiments, the delivery diagnostic circuit 340 may be structured to correlate the first and second pump parameters to the first and second dosing parameters (e.g., Injector OnTime). The first and second dosing parameters may correspond to the first and second positions. For example, as illustrated in FIG. 4, the first and second pump parameters (e.g., the first Pump Command (%) which is approximately 15% at DL1 and the second Pump Command (%) which is approximately 35% at DL2) are correlated to the first and second dosing parameters (e.g., the Injection OnTime at DL1 at 0 ml/s and Injection OnTime at DL2 at 1.5 ml/s). In turn, the delivery status is determined based, at least in part, on the interpretation of the first and second pump parameters and the first and second dosing parameters as described herein which, thereby, determines the reductant delivery performance.

Figure 5:
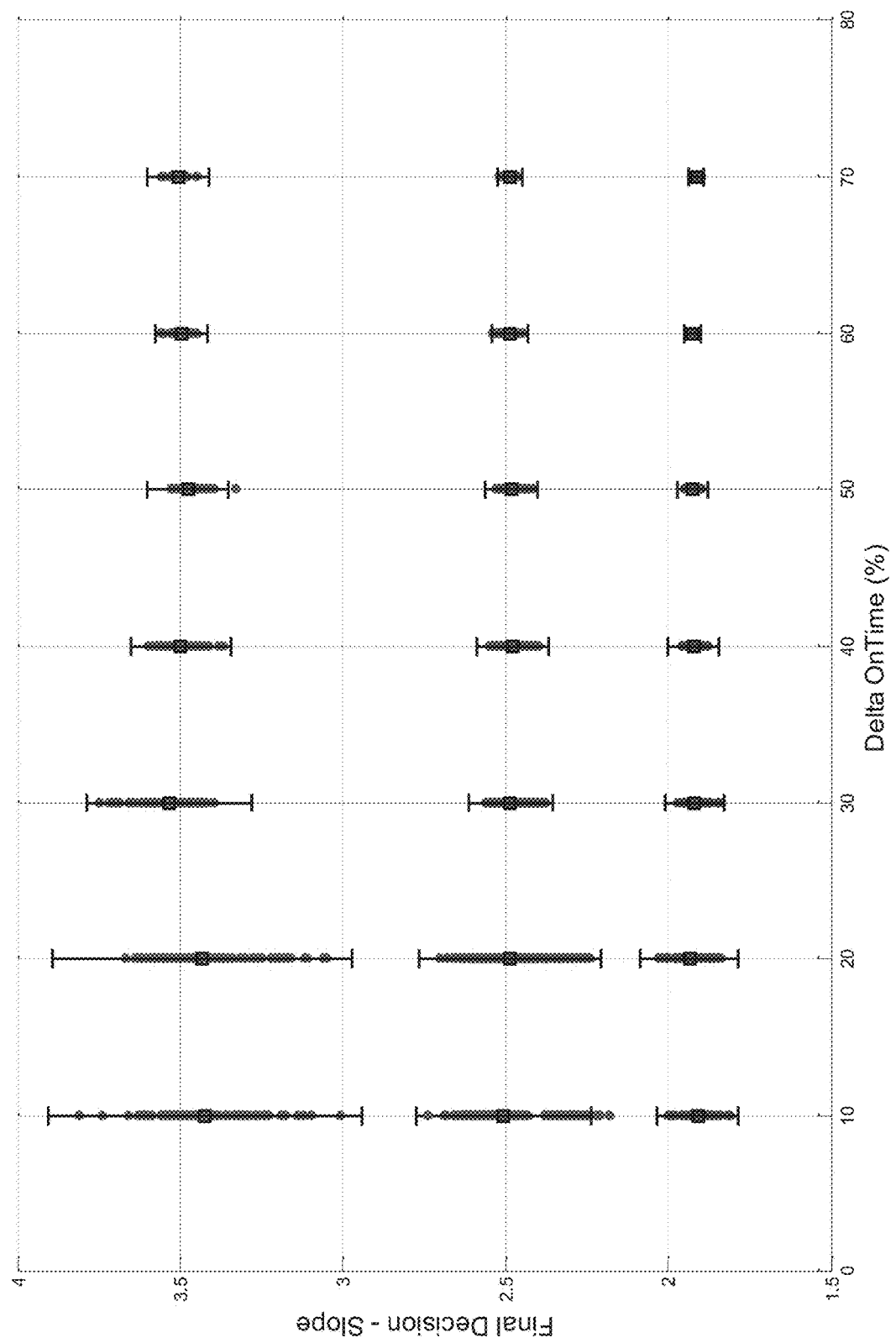
FIG. 5 is a plot illustrating the relationship between the dosing parameters and the delivery status according to an example embodiment.

Referring now to FIG. 5, a plot illustrating the relationship between the dosing parameters and the delivery status is shown according to an example embodiment. As will be appreciated, the Inventors have determined that the difference (e.g., the delta) between the first and second dosing parameters provides an improved indication of reductant delivery performance when compared to the actual values corresponding to the first and second dosing parameters. For example, as depicted in FIG. 5, the difference between the first and second dosing parameters, such as the Injector OnTime of 10% and 40%, yields a ΔOntime=30%. There is also a similar reductant delivery performance provided by the difference between the first and second dosing parameters, such as the Injector OnTime of 30% and 60%, which also yield a ΔOntime=30%. Furthermore, as the difference in the first and second dosing parameters (e.g., Injector OnTime (%) at DL1 and DL2) increases, the diagnostic separation improves. Alternatively or additionally, as the difference in the first and second dosing parameters (e.g., Injector OnTime (%) at DL1 and DL2) decreases, the diagnostic separation may be reduced. For example, utilizing the first and second dosing parameters (e.g., Injector OnTime of 10% and 11% which yields ΔOntime=1%) to determine a delivery status may result in a reduction of the diagnostic separation. As depicted, the error bar illustrates the mean and ±3δ deviation for the determination of the delivery status. The mean is illustrated by the square and the ±3δ deviation is shown by the errors bars. The general trend as illustrated is that the higher the ΔOnTime the larger the separation between the baseline and the ±30% delivery mechanism which is, for example, 30% eroded (e.g., under-restricted) and 30% blocked (e.g., over-restricted). When the ΔOntime≥30%, the diagnostic separation is within the ±3δ deviation band and results in a decreased chance of a false OBD response (e.g., activation of a false fault code, indicator lamp, or the like). When the ΔOntime<30%, there is diagnostic separation and an increased chance of a false OBD response.

Referring back to FIG. 3, the delivery diagnostic circuit 340, in further embodiments, may be structured to generate a stability command (e.g., a command generated in response to an OBD trigger configured to indicate fault or stability) based on the first and second dosing parameters (e.g., the commanded or actual OnTime or reductant flow). As will be appreciated, the Inventors have determined that the stability of the delivery mechanism 208 may be indicated by a correlation of the dosing parameters (e.g., the commanded or actual OnTime or reductant flow) and other system parameters or characteristics (e.g. the error in reductant pressure control, injector operation data, etc.). In some example embodiments, a properly functioning delivery mechanism 208 may be indicated when the dosing parameters (e.g., the commanded OnTime) correlate to (e.g., match, equate to, etc.) the dosing values (e.g., the actual OnTime). Accordingly, the delivery diagnostic circuit 340 may be structured to determine a plurality of predetermined threshold values, based, at least in part, on the first and second dosing parameters (e.g., the commanded OnTime at DL1 and DL2).

In some embodiments, the delivery diagnostic circuit 340 may be structured to determine whether the plurality of the predetermined threshold values exceeds a plurality of values corresponding to the first and second dosing parameters. In turn, the delivery diagnostic circuit 340 may be structured to generate the stability command in response to the plurality of predetermined threshold values exceeding the plurality of values corresponding to the first and second dosing parameters. In further embodiments, if the dosing parameters do not match the dosing values, the delivery diagnostic circuit may be structured to generate a stability command (e.g., a command generated in response to an OBD trigger configured to indicate fault).

In some embodiments, the delivery diagnostic circuit 340 may be structured to provide the stability command to the operator I/O device 120 (e.g., an interactive display, a touchscreen device, one or more buttons and switches, voice command receivers) to communicate the status of the reductant delivery performance to an operator of the engine system 10. Alternatively or additionally, the stability command may be stored in memory (e.g., memory 103) by the delivery diagnostic circuit 340.

Figure 6:
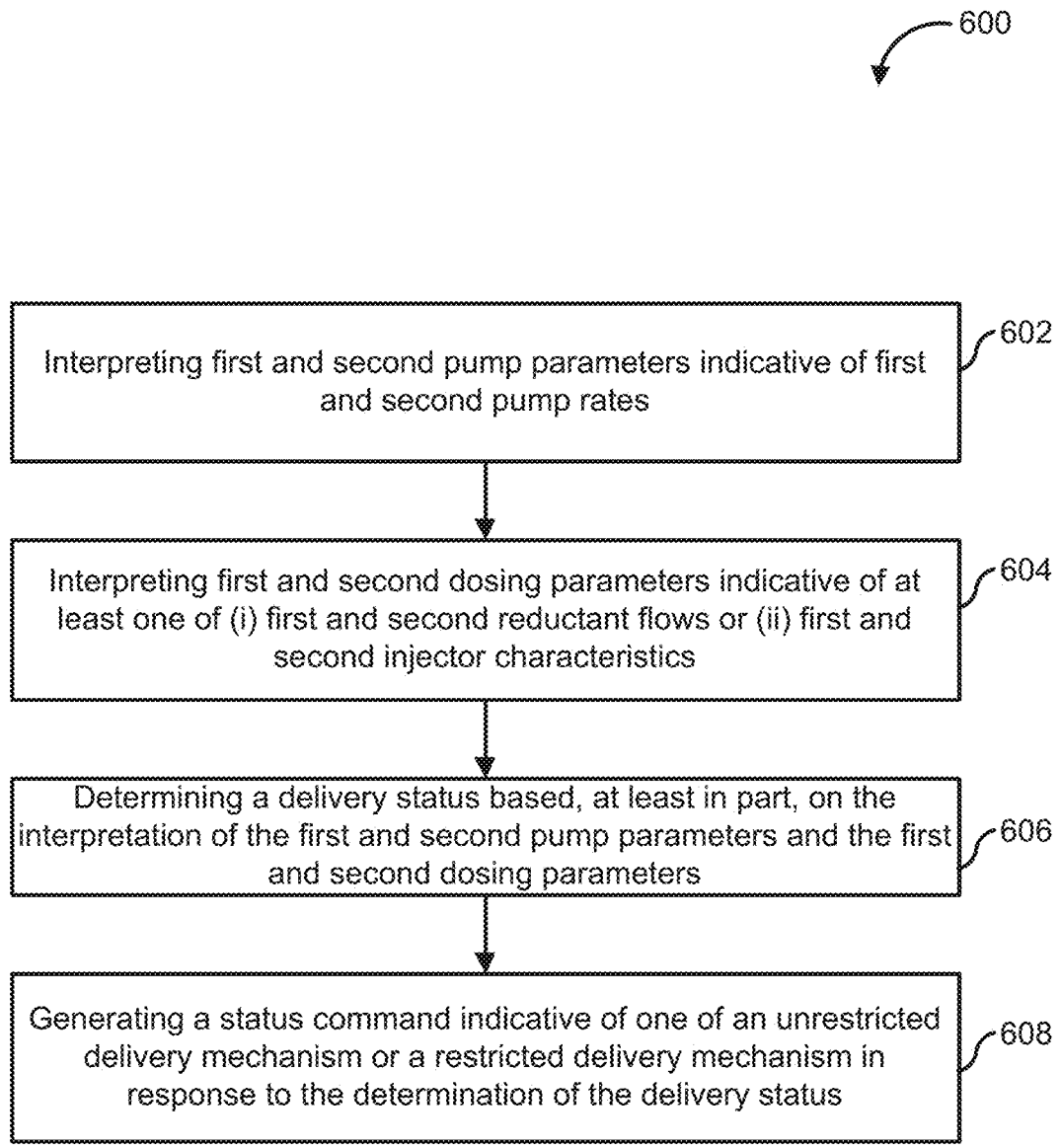
FIG. 6 is a schematic diagram of a flowchart of a method for generating a status command indicative at least one of an under-restricted delivery mechanism or an over-restricted delivery mechanism, according to an example embodiment.

Referring now to FIG. 6, a flowchart of a method of generating a status command indicative at least one of an under-restricted delivery mechanism or a over-restricted delivery mechanism is shown, according to one embodiment. According to one embodiment, method 600 represents a laboratory-based method (e.g., in a test engine set up). Based on the results of method 600, the circuits in the controller 100 may be calibrated (e.g., the first and second pump parameters indicative of first and second pump rates reinterpreted, the first and second dosing parameters indicative of first and second reductant flows reinterpreted, the delivery status redetermined, etc.). According to another embodiment, method 600 may be implemented in a service tool utilized by a technician. In this regard, the technician may troubleshoot one or more of the circuits of the controller 100. In still another embodiment, the method 600 may be embodied in the controller 100 such that the controller 100 may continuously experience process improvement and refinement for the generation of the status command indicative at least one of an under-restricted delivery mechanism or a over-restricted delivery mechanism. All such variations are intended to fall within the spirit and scope of the present disclosure.

At process 602, first and second pump parameters indicative of first and second pump rates are interpreted. The first and second pump rates may include a pump speed. The first and second pump parameters may include a pump command. At steady-state operation (e.g., a state by which the properties, parameters, etc. of the system are consistent), the pump speed may be approximately equal or proportional to the pump command. Accordingly, the first and second pump parameters are correlated to the first and second pump rates. Responsive to the correlation of the pump parameters to the pump rates, the first and second pump parameters indicative of first and second pump rates are interpreted.

At process 604, first and second dosing parameters indicative of at least one of (i) first and second reductant flows or (ii) first and second injector characteristics are interpreted. The first and second reductant flows may include the DEF flow, while the first and second injector characteristics may include the error in reductant pressure control, data, or information relating to operation of the injector, etc. The first and second dosing parameters may include one or more dosing values (e.g., OnTime commands). The DEF flow may be approximately equal to the dosing values. Accordingly, the first and second reductant flows are correlated to the first and second dosing parameters. Responsive to the correlation of the first and second reductant flows to the first and second dosing parameters, the first and second dosing parameters indicative of first and second reductant flows are interpreted.

At process 606, the delivery status may be determined based, at least in part, on the interpretation of the first and second pump parameters and the first and second dosing parameters. The pump parameters and the dosing parameters may be averaged over a calibratable time duration at a plurality of positions (e.g., at a first level and a second level). The delivery status may be determined based on a difference of the first and second pump parameters and a difference of the first and second dosing parameters. Accordingly, the example process (4) may be utilized to determine the delivery status.

At process 608, a status command indicative of an under-restricted delivery mechanism or an over-restricted delivery mechanism may be generated in response to the determination of the delivery status. In turn, the status command may be provided to the operator I/O device 120 (e.g., an interactive display) to communicate the status of the reductant delivery performance to an operator of the engine system 10.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit.

Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network. Where a circuit or portions of a circuit are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope. No claim element herein is to be construed under the provisions of 35 U.S.C. § 112, sixth paragraph, unless the element is expressly recited using the phrase "means for."

What is claimed is:

1. A system having a pump and an injector coupled to the pump, the system further comprising:
a controller coupled to the pump and the injector, the controller structured to:
determine a change of reductant flow relative to a change of pump rate of the pump; and
generate a status command indicative of at least one of an under-restricted injector or an over-restricted injector in response to the determination of the change of reductant flow relative to the change of pump rate of the pump.

2. The system of claim 1, wherein the controller is further structured to:
determine whether the determination of the change of reductant flow relative to the change of pump rate exceeds a predetermined threshold.

3. The system of claim 2, wherein the controller is further structured to:
generate the status command indicative of the over-restricted injector based on the determination of the change of reductant flow relative to the change of pump rate being below the predetermined threshold.

4. The system of claim 2, wherein the controller is further structured to:
generate the status command indicative of the under-restricted injector based on the determination of the change of reductant flow relative to the change of pump rate being above the predetermined threshold.

5. The system of claim 1, wherein, based on the status command indicating the over-restricted injector, the controller is structured to provide an indication of at least one of an at least partially blocked injector, a slow-responding injector solenoid, a blocked line, or a defective pump.

6. The system of claim 1, wherein, based on the status command indicating the under-restricted injector, the controller is structured to provide an indication of at least one of an eroded injector, a faulty injector solenoid, a leaky line, or a defective pump.

7. The system of claim 1, wherein the controller is further structured to:
control an engine coupled to the injector and the pump in response to the determination of the over-restricted injector or the under-restricted injector.

8. The system of claim 1, wherein the controller is further structured to:
determine the change of reductant flow relative to the change of pump rate of the pump based on an average of the reductant flow and an average of the pump rate over a calibratable time duration at a plurality of positions, wherein the plurality of positions correspond with calibratable dosing levels.

9. The system of claim 8, wherein a first position is indicative of a first injection dosing level and a second position is indicative of a second injection dosing level higher than the first injection dosing level.

10. The system of claim 1, wherein the controller is further structured to:
generate the status command based on a difference of a first and a second pump rate and a difference of a first and a second reductant flow.

11. A non-transitory computer-readable medium storing instructions that, when executed by one or more processors, cause the one or more processors to perform operations comprising:
determine a change of reductant flow relative to a change of pump rate of a pump; and
generate a status command indicative of at least one of an under-restricted injector or an over-restricted injector based on the determination of the change of reductant flow relative to the change of pump rate of the pump.

12. The non-transitory computer-readable medium of claim 11, wherein the operations further comprise:
determine first and second pump rates; and
determine first and second reductant flows.

13. The non-transitory computer-readable medium of claim 12, wherein the operations further comprise:
correlate the first and second pump rates of the pump to the first and second reductant flows of the injector, wherein a delivery status is determined based on the correlation of the first and second pump rates to the first and second reductant flows; and
generate the status command based on the delivery status.

14. The non-transitory computer-readable medium of claim 13, wherein the operations further comprise:
determine the delivery status based on a difference of the first and second pump rates and a difference of the first and second reductant flows.

15. A method, comprising:
determining, by a controller, a change of reductant flow of an injector relative to a change of pump rate of a pump; and
generating, by the controller, a status command indicative of at least one of an under-restricted injector or an over-restricted injector in response to the determination of the change of reductant flow relative to the change of pump rate of the pump.

16. The method of claim 15, further comprising:
determining whether the determination of the change of reductant flow relative to the change of pump rate exceeds a predetermined threshold.

17. The method of claim 16, further comprising:
generating the status command indicative of the over-restricted injector based on the determination of the change of reductant flow relative to the change of pump rate being below the predetermined threshold.

18. The method of claim 16, further comprising
generating the status command indicative of the under-restricted injector based on the determination of the change of reductant flow relative to the change of pump rate being above the predetermined threshold.

19. The method of claim 15, further comprising:
controlling an engine coupled to the injector and the pump in response to the determination of the over-restricted injector or the under-restricted injector.

20. The method of claim 15, further comprising:
determining the change of reductant flow relative to the change of pump rate of the pump based on an average of the reductant flow and an average of the pump rate over a calibratable time duration at a plurality of positions, wherein the plurality of positions correspond with calibratable dosing levels.

* * * * *